United States Patent [19]

Jackson et al.

[11] 4,265,416

[45] May 5, 1981

[54] ORBITER/LAUNCH SYSTEM

[75] Inventors: Liam R. Jackson; John P. Weidner, both of Newport News; William J. Small, Seaford; James A. Martin, Gloucester, all of Va.

[73] Assignee: The United States of America as represented by the Administrator of the National Aeronautics and Space Administration, Washington, D.C.

[21] Appl. No.: 910,794

[22] Filed: May 30, 1978

[51] Int. Cl.³ .......................... B64C 37/02; B64D 5/00
[52] U.S. Cl. ........................................ 244/2; 244/160; 244/63
[58] Field of Search .................. 244/160, 162, 172, 63, 244/55, 2, 3, 53 B, 1 N, 163

[56] References Cited

U.S. PATENT DOCUMENTS

| D. 220,983 | 6/1971 | Webb et al. ........................ 244/162 X |
| 2,921,756 | 1/1960 | Borden et al. ........................ 244/63 |
| 3,369,771 | 2/1968 | Walley et al. ........................ 244/162 |
| 3,576,300 | 4/1971 | Palfreyman ........................ 244/1 N |
| 3,702,688 | 11/1972 | Faget ........................ 244/2 X |
| 3,830,666 | 8/1974 | Schneider ........................ 244/163 |
| 3,955,784 | 5/1976 | Salkeld ........................ 244/172 |

FOREIGN PATENT DOCUMENTS

| 1043516 | 11/1953 | France ........................ 244/2 |
| 1939338 | 2/1970 | Fed. Rep. of Germany ........................ 244/55 |

OTHER PUBLICATIONS

Smith, "An Approach to Economic Space Transportation", *Aircraft Engineering*, Jun., 1966, pp. 20 & 25-31.

Primary Examiner—Galen L. Barefoot
Attorney, Agent, or Firm—Wallace J. Nelson; John R. Manning; Howard J. Osborn

[57] ABSTRACT

An orbit vehicle launch system including reusable turbojet propelled booster vehicles releasably connected to a reusable rocket powered orbit vehicle. The coupled orbiter-booster combination takes off horizontally and ascends to staging altitude and speed under booster power with both orbiter and booster wings providing lift. After staging, the booster vehicles fly back to earth for horizontal landing and the orbiter vehicle continues ascending to orbit.

5 Claims, 6 Drawing Figures

ORBITER/LAUNCH SYSTEM

ORIGIN OF THE INVENTION

The invention described herein was made by employees of the U.S. Government and may be manufactured and used by or for governmental purposes without payment of any royalties thereon or therefor.

BACKGROUND OF THE INVENTION

This invention relates to an orbit vehicle launch system and relates in particular to the utilization of a plurality of reusable turbojet propelled booster vehicles with fly back capability to provide horizontal takeoff and efficient ascent of the orbit vehicle to staging altitude and speeds, with both orbiter and booster wings providing lift during takeoff and ascent.

Projections for earth orbiting solar power collecting stations and industrial processing plants indicate the need for frequent space flights. The current concept for accomplishing these flights, the space shuttle concept, is the use of refurbishable solid rocket boosters and an oxygen/hydrogen rocket propelled orbiter vehicle for the launch of large payloads to earth orbit. The orbiter vehicle, carrying a payload of approximately 65,000 pounds mass (65K $lb_m$), is mounted piggyback fashion to a large expendable hydrogen fuel tank which has refurbishable solid rocket boosters attached on the sides. The space shuttle system is designed for vertical takeoff (VTO) under the booster rocket power. At staging altitude, the booster rockets drop from the hydrogen fuel tank and fall to earth, landing in the ocean to be recovered later for refurbishing. The orbiter and tank continue ascending to orbit altitude under oxygen/hydrogen rocket power. The oxygen and hydrogen propellant tanks are discarded at orbit altitude. The orbiter retains enough propellant to enter circular orbit and to jetison from orbit and glide to a horizontal earth landing.

The mission scenario shows that the current space shuttle's high launch costs must be reduced by an order of magnitude before large scale space utilization can become a practical goal. The dominant factors contributing to the high space launch costs are the replacement of expendable propellant tanks and the recovery, refurbishment, and refueling of the solid rocket motors. A variety of space transportation systems have been studied which avoid these recurring costs. However, several factors such as high technical risk, high development costs, and lack of versatility of horizontal takeoff capability, have precluded commitment to any particular system to date. None of the previous systems simultaneously satisfy the low cost and versatility goals. To provide a comparative basis to assess the present invention, a brief review of the various space transportation systems studied to date is warranted.

Several concepts of fully reusable vehicles with the versatility of horizontal takeoff (HTO) from runways have been studied. One concept, the aerospace plane, requires a very low and presently unobtainable structural mass fraction, scramjet propulsion, and complex air collection equipment. A second reusable HTO vehicle concept, the air breathing launch vehicle (ABLV) uses turbojets, ramjets, and scramjets with hydrogen fuel in the booster, which separates at a Mach number of approximately 10. Consequently, the first stage is larger than the orbiter. Furthermore, the high speed and advanced propulsion systems of the launch vehicle requires advanced technology with its associated high costs. A third reusable HTO concept, studied in several variations from the late fifties into the seventies, employs a large subsonic or supersonic carrier aircraft (usually designed for other missions) as a first stage. This large and complex booster stage would be very expensive. Therefore, the three reusable HTO vehicl concepts of the prior art satisfy the versatility goals but not the low cost goals.

More recent space transportation concepts studied, that avoid recurring costs of the space shuttle, include the single stage-to-orbit (SSTO) concepts. Most SSTO concepts are designed for vertical takeoff (VTO); one known concept is designed for horizontal takeoff from a rocket powered sled. The VTO concepts employ advanced rocket engines using both hydrocarbon and hydrogen fuel. An all hydrogen fueled VTO vehicle designed to carry the same payload as the current space shuttle, 65K $lb_m$, would have a relatively high gross weight of 3.6M $lb_m$. The sled launched HTO concept has been proposed to enable use of hydrogen fuel only (by use of a two position nozzle added to the current space shuttle main rocket engines (SSME) at considerably less gross weight than the all hydrogen VTO concept. But a sled offers limited takeoff azimuths and few launch sites, thus limiting operational versatility. Neither the VTO nor the sled launched HTO operational modes offer the convenience of a conventional runway takeoff mode. Thus, the single stage-to-orbit concepts may satisfy cost objectives but lack versatility.

The present invention employs current engine and structural technology to provide fully reusable horizontal takeoff space transport that has potentially low initial and operating costs. This potential stems from the use of small reusable turbojet propelled, winged booster vehicles instead of space shuttle type solid rocket boosters, or large ABLV or carrier aircraft boosters discussed above. The present invention introduces a new concept in orbiter launch systems, called "parallel lift", which enables the utilization of the small boosters. In the parallel lift system, both orbiter and booster wings provide lift during takeoff and climb with the orbiter wings providing approximately 70–75 percent of the total lift. This permits the booster to be reduced by approximately one-third in size and weight compared to a booster providing the entire lift during takeoff and climb. The orbiter wing is sized primarily to withstand re-entry heating. The booster wing is sized for flyback and landing, but is modified to better match the orbiter wing for takeoff.

Furthermore, for a given payload a lighter and less expensive orbiter vehicle can be used than is feasible with the advanced technology SSTO concepts. For 65K $lb_m$ payload, two booster vehicles, with fuel, have a combined weight of only 0.8M $lb_m$ and the total launch vehicle weight is 2.6M $lb_m$, about half that of current space shuttle.

In addition, this space transport concept offers the potential operational versatility of lateral offset orbit insertion, ferrying capability, intact abort and recall landing and versatility in takeoff location, which in combination may enable round trips to space from many existing airfields.

An object of the present invention is to provide a current technology low cost and versatile orbiter launch system.

A further object of the present invention is to provide a launch system which yields the foregoing advantages and utilizes small turbojet powered, winged booster vehicles releasably connected to the orbiter vehicle, and which utilizes parallel lift during takeoff and ascent to staging.

A further object of the present invention is to provide a launch system offering operation versatility of offset orbit insertion, ferrying capability, intact abort and recall landing and horizontal takeoff.

Other objects and advantages of the present invention will be readily apparent from the following description and drawings which illustrate a preferred embodiment of the present invention.

SUMMARY OF THE INVENTION

The present invention involves a booster system and a method of placing an orbiter vehicle in orbit whereby a number of reusable turbojet propelled booster vehicles, small in relation to the orbiter, are releasably connected to the orbiter vehicle, the coupled vehicles takeoff horizontally using both booster and orbiter lift and ascend to staging altitude and speed under booster power, the boosters are released from the orbiter and fly back to earth for horizontal landing and the orbiter continues to ascend to orbit.

DESCRIPTION OF THE PREFERRED EMBODIMENT

Figure 1:
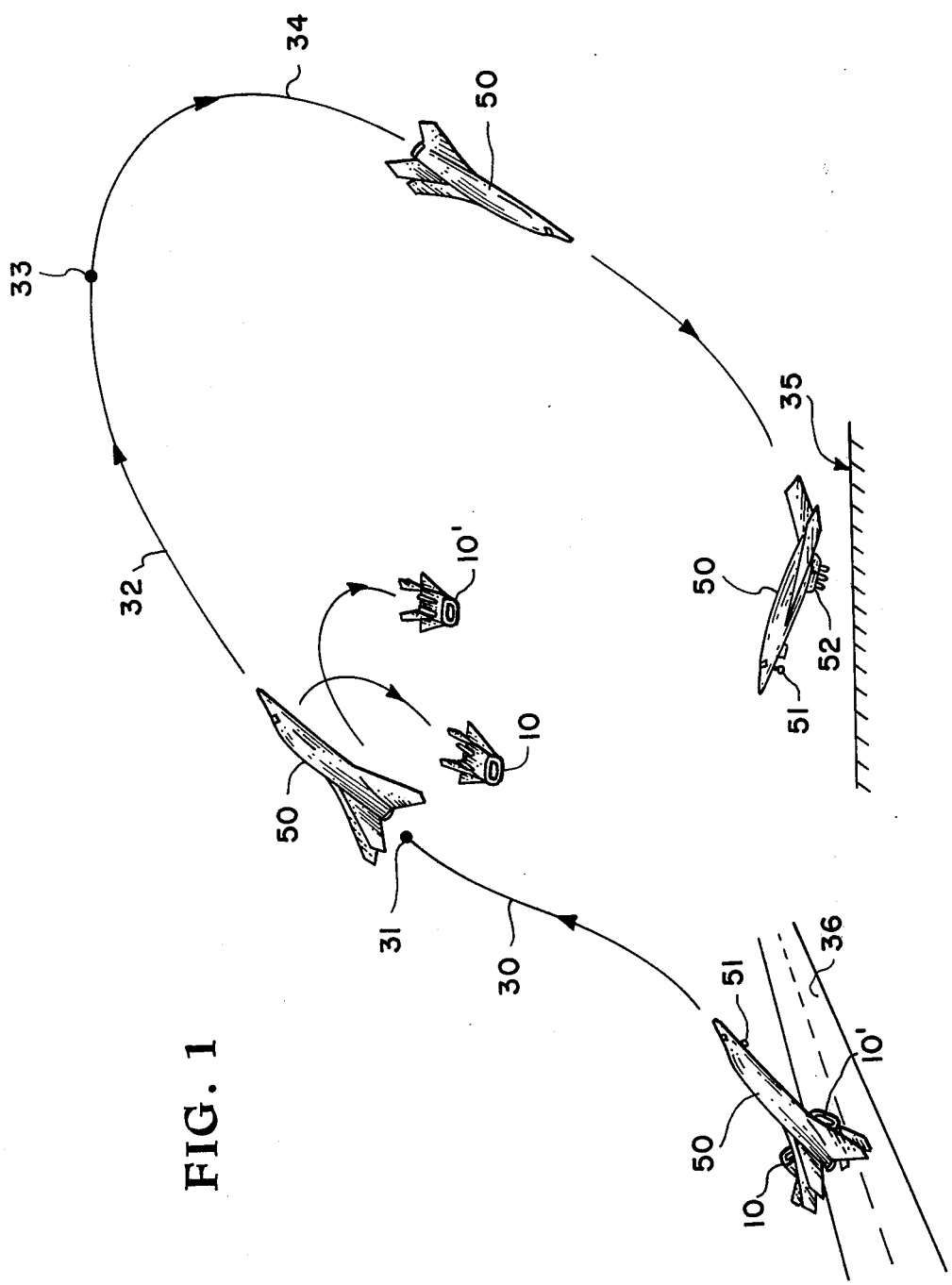
FIG. 1 is a schematic diagram showing the orbiter-booster flight mission profile.

FIG. 1 shows the basic mission flight profile of the present invention. The orbiter vehicle designated generally by the reference numeral 50, having two identical booster vehicles, designated by reference numerals 10 and 10′, releasably attached thereto takes off horizontally under booster turbojet power from any conventional runway 36 of approximately 10,000 feet in length. The orbiter-booster combination ascends, still under booster power, using vortex lift from both orbiter and booster wings on trajectory 30 to staging altitude and speed represented by point 31. Here boosters 10 and 10′ are released and fly back under radio control to earth for horizontal landing. The orbiter vehicle 50 continues ascent under orbiter 50 rocket power from staging point 31 on a trajectory 32 to orbit altitude at point 33. Orbiter vehicle 50 remains in orbit, represented by point 33, as desired until re-entry is initiated to send orbiter 50 on de-orbit trajectory 34. Orbiter 50 normally performs an unpowered horizontal landing on a conventional runway 35; however, retractable turbojets and added fuel may be used for a powered landing with some sacrifice in payload to orbit. Note forward and rear retractable landing gear 51 and 52 are provided on orbiter 50. Forward landing gear 51 may be used in both takeoff and landing of orbiter 50, whereas rear landing gear 52 is used only for landing. The landing gear of boosters 10 and 10′ (FIG. 2) support the weight of orbiter 50 during takeoff.

Figure 2:
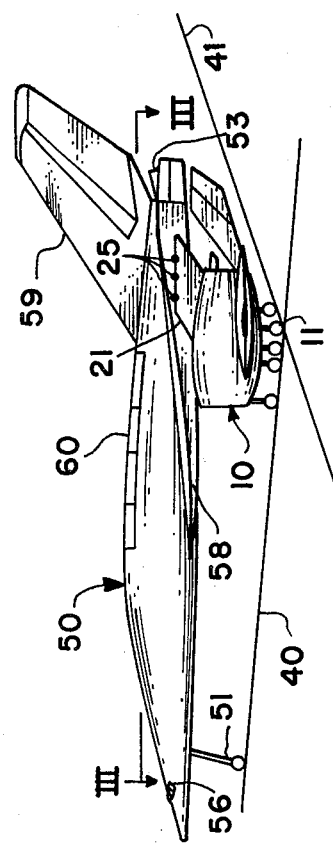
FIG. 2 is a side view of an orbiter coupled to boosters prior to takeoff.

Referring now to FIG. 2 there is shown an elevation view of the preferred embodiment of the present invention before takeoff. Boosters 10 and 10′ are releasably coupled below wings 58 of orbiter 50. These releasable couplings may be accomplished by a variety of means, e.g., slots and latches, exploding bolts or the like. In the preferred embodiment a pylon 21 extends upward from booster 10 for coupling at the bottom surface of wing 58 with exploding bolts 25.

Orbiter 50 and boosters 10 and 10′ have aerodynamic surfaces, elevons and rudders sufficient to enable flight of each independently and flight of both when in the coupled configuration. Booster landing gear 11 are retractable and are designed to be adaptable to varying vehicle runway pitch angles during takeoff and landing as illustrated in FIG. 2 by reference plane 40, aligned with the forward wheels, and reference plane 41, aligned with the rear wheels.

Figure 3:
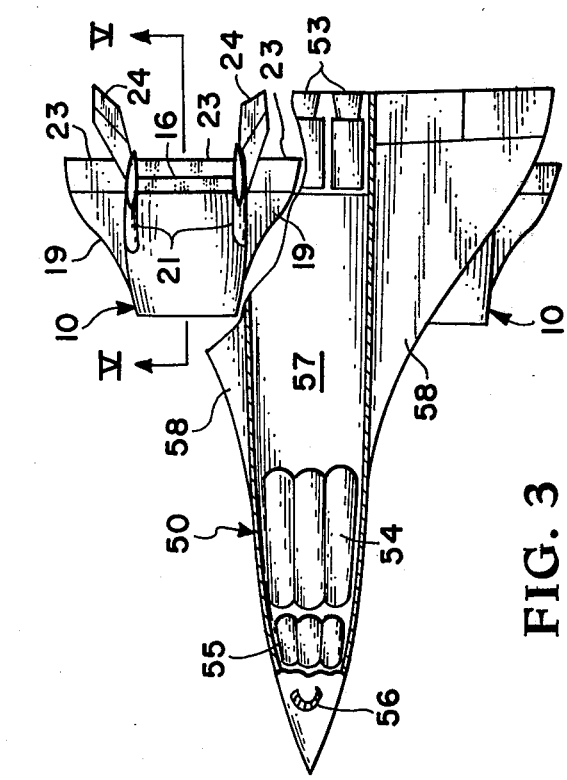
FIG. 3 is a plan sectional view taken along line III—III of FIG. 2 with a partial cutaway showing a plan view of one booster vehicle.

FIG. 3 illustrates the general layout of the interior of the orbiter vehicle 50. The controls and life support system (not shown) are situated in the nose of orbiter 50. Window 56 enables visual observation by the pilot from the cockpit. Situated aft of the cockpit are the liquid oxygen tanks 55 and liquid hydrogen tanks 54. The ratio of hydrogen to oxygen fuel usage is selected to maximize efficiency. Payload bay 57 lies aft of liquid hydrogen tanks 54 and access thereto is gained through hatches 60 (FIG. 2).

Main rocket engines 53 are located in the tail and are similar to current space shuttle main rocket engines with an expansion ratio increased to 155:1 since the engines will operate only at altitudes above 50,000 feet. The structure of orbiter 50 is based on current space shuttle orbiter technology; however, integral wing tanks for liquid oxygen containment could significantly reduce wing weight.

FIG. 3 also shows a top view of booster 10. Pylons 21 have surfaces contoured to minimize drag. Elevon 23 runs the entire width of delta wing 19. Vane 16 aids in vehicle guidance by regulating the engine exhaust gas discharge angle.

Figure 4:
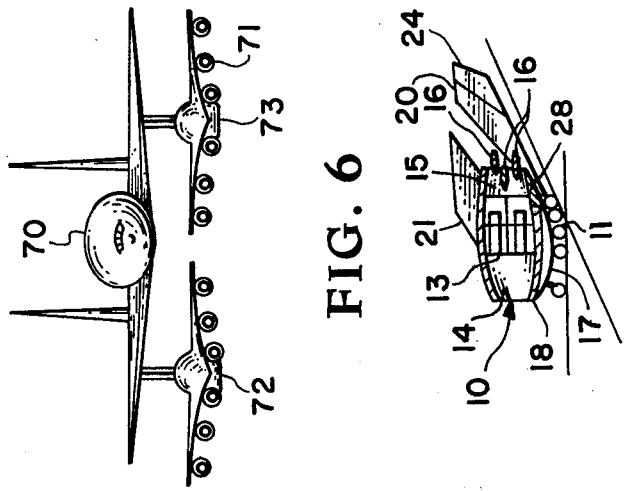
FIG. 4 is a front view of the orbiter-booster combination of FIG. 1.

FIG. 4 shows a front view of the coupled boosters 10 and 10′ and orbiter 50. Each booster 10 and 10′ is powered by a cluster of eight turbojet engines 13. Each engine 13 delivers a thrust of 53,000 pounds force each. This cluster arrangement is optimal when staging is desired at subsonic speeds. The preferred embodiment is designed to stage at a speed of approximately Mach=0.8.

Figure 5:
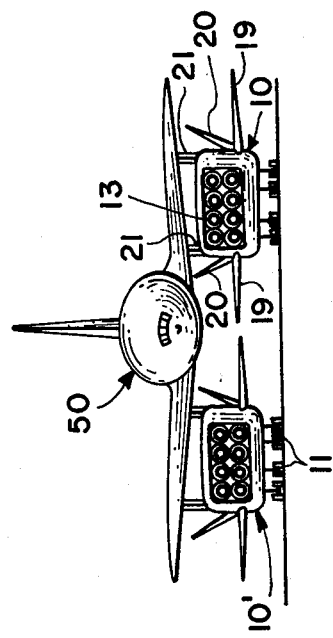
FIG. 5 is an elevational sectional view taken along line V—V of FIG. 3.

FIG. 5 shows the interior of the booster vehicle 10. Turbojets 13 share a common inlet duct 14 and a common exhaust duct 15. Three tiltable vanes 16 serving to regulate turbojet exhaust gas exit angle are shown. Elevon 23 on wing 19 and rudder 24 on tail 20 aid in vehicle guidance and landing gear 11 are retractable into bay 17.

Avionics for remote control flight of booster 10 are mounted in any convenient location and are represented in the preferred embodiment by area 18 (FIG. 5). Fuel tank 28 holds sufficient fuel to supply the booster turbojets 13 during takeoff, staging and powered landing.

Figure 6:
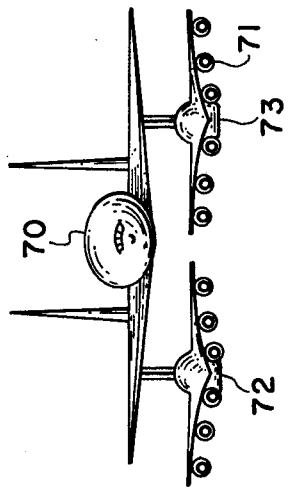
FIG. 6 is a front view of an orbiter-booster combination similar to FIG. 4 showing booster vehicles designed for supersonic staging.

For staging at supersonic speeds the cluster arrangement may result in excessive transonic drag and therefore the engines would be separately mounted in a swept arrangement along the wing of the booster. FIG. 6 shows the supersonic staging configuration. Boosters 72 and 73 are releasably connected to orbiter 70 and turbojet engines 71 are mounted in a swept back configuration on the booster wings to reduce the maximum frontal mach plane cross-sectional area of the orbiter-booster combination at any fuselage station.

Booster 10 is constructed of aluminum alloy in a conventional manner. Supersonic staging boosters 72 and 73 (FIG. 6) are similarly constructed except that the skin of the fuselage and wings is thickened to provide heat sink thermal protection.

The above described orbiter launch system utilizes turbojet propulsion during the boost phase of ascent and rocket propulsion after staging for orbiter ascent. The present invention utilizes the vortex lift phenomenon during takeoff and flight whereby additional lift is provided by contouring the orbiter and booster wings to create vortices in the air stream around the wings. The Concorde supersonic transport utilizes this same phenomenon however, the present invention employs vortex lift to achieve low wing weight at an acceptable takeoff speed because of the much higher takeoff wing loading than the Concorde. This system delivers a high payload for a given consumption of fuel and propellants with an ascent time to orbital insertion altitude of approximately twenty minutes. A shorter ascent time may be important for some missions than payload performance. Utilizing rocket or throttled rocket propulsion and turbojet propulsion simultaneously during all or part of the boost phase could reduce the ascent time down to approximately eight minutes with the same amount of fuel and a lighter payload.

The above described orbiter launch system stages at a subsonic speed of approximately Mach=0.8. A system which stages at supersonic speed in the range of Mach=2 to 3.5 would require higher initial development cost but would yield lower recurring operating costs as a result of the decrease in orbiter hydrogen and oxygen fuel requirements and other orbiter weight associated high costs.

The above described orbiter launch system utilizes turbojet engines on the booster vehicle, alternatively fan jet engines may be employed.

The utilization of two booster vehicles on the above described orbiter launch system yields a development cost and versatility advantage over using a single, larger booster vehicle. However, the use of two booster vehicles in the preferred embodiment shall not be construed to limit the invention thereto.

The above described description and drawings are only illustrative of two embodiments which achieve the objects, features, and advantages of the present invention, and it is not intended that the present invention be limited thereto. Any modifications of the present invention which come within the spirit and scope of the following claims are considered part of the present invention.

What is claimed as new and desired to be secured by Letters Patent of the United States is:

1. An orbiter vehicle launching system comprising in combination:
   (a) an orbiter vehicle having aerodynamic orbiter wings; and
   (b) a plurality of booster vehicles each having aerodynamic booster wings and powered by turbojet engine means, each said booster vehicle being releasably connected to said orbiter vehicle for propelling the combination thereof during takeoff and ascent to staging altitude and speed, each said booster vehicle being capable of powered post-staging descent and horizontal landing;
   each said booster vehicle further comprising sufficient aluminum heat sink structure supporting said turbojet engine means therein and having sufficient aerodynamic surfaces to enable controlled powered flight of each said booster vehicle, each said booster vehicle further comprising a pylon extending from said heat sink structure to said orbiter vehicle, and each said pylon being attached to said orbiter vehicle with explosive bolts.

2. An orbiter vehicle launching system as in claim 1 wherein each said turbojet means comprises:
   a cluster of turbojet engines;
   an intake duct to convey air from the atmosphere to said cluster of turbojet engines;
   an exhaust duct to convey combustion exhaust gases from said cluster of turbojet engines to the atmosphere; and
   at least one jet fuel tank for supplying fuel to said cluster of turbojet engines.

3. An orbiter launching system as in claim 1 wherein said turbojet engine means comprises:
   a plurality of turbojet engines separately mounted on each of said booster wings; and
   at least one jet fuel tank for supplying fuel to said plurality of turbojet engines.

4. An orbiter vehicle launching system as in claim 1 further comprising forward and rear retractable landing gear disposed on said orbiter vehicle and retractable landing gear provided on each said booster vehicle whereby the combined booster vehicle landing gear the forward orbiter vehicle landing gear serve to support the combined loaded weight of said orbiter vehicle and said booster vehicle to enable horizontal launch system takeoff.

5. An orbiter vehicle launching system as in claim 1 wherein the gross weight of said orbiter vehicle with payload is approximately twice the combined weight of said booster vehicles and wherein each said booster vehicle is provided with retractable landing gear and said landing gear is adaptable for variable runway pitch angles during takeoff and landing, the forward wheels of said landing gear being aligned with one plane and the rear wheels of said landing gear being aligned with a second plane.

* * * * *